United States Patent
Haxo

(10) Patent No.: US 12,534,492 B2
(45) Date of Patent: Jan. 27, 2026

(54) METHODS AND KITS TO IMPROVE THE FLUORESCENT SIGNAL OF DMB-LABELED SIALIC ACIDS

(71) Applicant: Agilent Technologies, Inc., Santa Clara, CA (US)

(72) Inventor: Francis T. Haxo, San Francisco, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1102 days.

(21) Appl. No.: 17/613,463

(22) PCT Filed: Jun. 6, 2020

(86) PCT No.: PCT/US2020/036515
§ 371 (c)(1),
(2) Date: Nov. 22, 2021

(87) PCT Pub. No.: WO2020/251862
PCT Pub. Date: Dec. 17, 2020

(65) Prior Publication Data
US 2022/0242896 A1 Aug. 4, 2022

Related U.S. Application Data

(60) Provisional application No. 62/861,924, filed on Jun. 14, 2019.

(51) Int. Cl.
*C07H 7/033* (2006.01)
*G01N 33/58* (2006.01)

(52) U.S. Cl.
CPC ............. *C07H 7/033* (2013.01); *G01N 33/58* (2013.01)

(58) Field of Classification Search
None
See application file for complete search history.

(56) References Cited

U.S. PATENT DOCUMENTS

| | | |
|---|---|---|
| 2004/0038419 A1 | 2/2004 | Weiner |
| 2009/0252749 A1 | 10/2009 | Leister |
| 2018/0321252 A1 | 11/2018 | Chemmalil |

FOREIGN PATENT DOCUMENTS

| | | | |
|---|---|---|---|
| CN | 102072953 A | 5/2011 | |
| WO | WO 2007/076032 A1 | 7/2007 | |
| WO | WO-2007076032 A2 * | 7/2007 | ............. A61K 38/17 |
| WO | WO 2016/081770 | 5/2016 | |

OTHER PUBLICATIONS

Guseva, E., International Search Report, PCT/US2020/036515, Sep. 10, 2020, ISA/RU, Moscow, Russia.
Guseva, E., Written Opinion, PCT/US2020/036515, Aug. 27, 2020, ISA/RU, Moscow, Russia.
Chemmmalil et al., A novel approach for quantitation of nonderivatized sialic acid in protein therapeutics using hydrophilic interaction? J Pharm Sci, 2015, pp. 15-24, v. 104.
Sassaki et al., "Application of acetate derivatives for gas chromatography-mass spectrometry: Novel approaches on carb, . . . ", l Chromatography A, 2008, pp. 215-222, v.

* cited by examiner

*Primary Examiner* — Michael G. Hartley
*Assistant Examiner* — Samantha L Mejias
(74) *Attorney, Agent, or Firm* — Laurence J. Hyman; Hyman IP Law

(57) ABSTRACT

The invention relates to a method and a kit for stably detecting sialic acid by an enzyme method. The method comprises the following steps of: generating N-acetylneuraminic acid from bound sialic acid under the catalysis of neuraminic acid aldolase; transforming the N-acetylneuraminic acid into N-acetylmannosamine under the catalysis of neuraminidase; reacting the product with mannosamine dehydrogenase and nicotinamide adenine dinucleotide (NAD) to generate reduced nicotinamide adenine dinucleotide (NADH); and measuring the sialic acid content by detecting the amount of the generated NADH. The invention also relates to the kit prepared according to the method. The method and the kit are conveniently and quickly used, the sialic acid is not required to be redissolved by dissolving liquid, is stable for a long time and has small inter-bottle variation, the method and the kit are suitable for various biochemical analyzers, secondary pollution is avoided, and a production process method is simplified.

13 Claims, 3 Drawing Sheets

METHODS AND KITS TO IMPROVE THE FLUORESCENT SIGNAL OF DMB-LABELED SIALIC ACIDS

CROSS-REFERENCE TO RELATED APPLICATIONS

This application is a national stage application under 35 U.S.C. § 371 of International Application No. PCT/US2020/036515, filed Jun. 6, 2020, which is hereby incorporated by reference for all purposes. This application further claims the benefit of, and priority to, U.S. Provisional Patent Application No. 62/861,924, filed Jun. 14, 2019, the contents of which are incorporated herein by reference for all purposes.

STATEMENT OF FEDERAL FUNDING

Not applicable.

BACKGROUND OF THE INVENTION

This invention relates to the field of improving the signal from sialic acids, such as those released from glycoconjugates or reference standards, labeled with the dye 1, 2-diamino-4, 5-methyleneoxybenzene ("DMB").

A number of commercial and regulatory requirements make it necessary to determine the nature and amount of glycans present on a glycoprotein or glycopeptide, and particularly for glycoproteins used as therapeutic agents. Since the glycans attached to the glycoprotein can affect characteristics critical to the glycoprotein's function, including its pharmacokinetics, stability, bioactivity, and immunogenicity, it is important to determine which ones are present. Characterization of glycans attached to biologics (such as therapeutic glycoproteins and vaccines) is required by the Food and Drug Administration to show composition of matter and consistency of manufacture, resulting in a need for extensive characterization of the product. Analysis of the profile of the carbohydrates is also important for quality control in the production of both therapeutic and non-therapeutic recombinant proteins, in which a change in carbohydrate profile may indicate stress in the system, signaling conditions that may require the contents of a commercial-scale fermenter to be discarded. There is therefore considerable interest by biochemists, clinical chemists, pharmaceutical manufacturers, and protein producers in determining the distribution profiles of glycans in biological samples, such as therapeutic glycoproteins.

Sialic acids are a family of 9-carbon, carboxylated 2-keto sugars found on many glycans associated with glycoproteins. As noted by Reiding, et al., Analyt. Chem., 2014, 86:5784-93, "N-glycans on mammalian proteins often exhibit terminal sialic acids such as N-acetylneuraminic acid, which . . . shows importance in cellular communication, and determines protein half-life. Sialic acids are most frequently attached to a terminal galactose via α2,6 or α2,3 glycosidic linkages and show different functionality as a consequence." Reiding et al., at p. 5784. Over 25 sialic acid derivatives have been identified in nature and have been shown to play a role in a variety of biological activities.

Determining the presence and type of sialic acids attached to a glycoprotein or other glycoconjugate can be conducted by releasing the sialic acids by enzymatic digestion of the sialic acids with sialidases or by partial acid hydrolysis by incubating the glycoprotein or other glycoconjugate at 80° C. in an acid solution, such as 2M acetic acid or 0.05 N HCl, for 1 to 3 hours. Once the sialic acids are released from any glycoconjugate to which they have been attached, they can be labeled with DMB and then detected by various analytical techniques. Typically, the sialic acids are labeled with DMB in a solution comprising approximately 1.5M acetic acid and at least one reductant, typically β-mercaptoethanol, the resulting DMB-labeled sialic acids are separated by liquid chromatography, and the separated, labeled sialic acids are provided to a fluorescence detector, which then quantitates the signal from the labeled sialic acids.

Unfortunately, acetic acid, which is perhaps the most common acid used in acid hydrolysis of sialic acids and in subsequent DMB-labeling of sialic acids, is strong-smelling and volatile. If not kept tightly capped, the acid reduces in volume, throwing off calculations of concentration. Further, β-mercaptoethanol, the reductant commonly used in DMB-labeling protocols, not only has a strong, unpleasant odor, but is also a toxin which can be fatal if inhaled, swallowed, or absorbed through the user's skin. And, while DMB-labeling is considered to be a sensitive and selective technique for detecting sialic acids present in a sample, some sialic acids are present on some glycoconjugates only in small amounts, and some glycoconjugates are so expensive or difficult to produce that it would be useful to reduce the amount of the glycoconjugate needed to measure its sialylation. Increasing the signal from DMB-labeled sialic acids would be helpful in increasing the ability to detect sialic acids in the sample, even if present only in small quantities.

There remains a need in the art for methods and kits that provide additional methods for increasing the signal from sialic acids labeled with DMB. Further, there remains a need in the art for methods using acids that are less volatile and have a lower odor than acetic acid, and for methods using reductants that are less toxic and have a lower odor than β-mercaptoethanol, yet which allow increasing the signal obtained from DMB-labeled sialic acids. Surprisingly, the present invention fulfills these and other needs.

BRIEF SUMMARY OF THE INVENTION

The invention provides methods and kits for improving the signal from free sialic acids, such as those released from glycoconjugates or reference standards, labeled with the dye 1, 2-diamino-4, 5-methyleneoxybenzene ("DMB"). In a first group of embodiments, the invention provides in vitro methods for labeling free sialic acids with DMB and, optionally, for analyzing the DMB-labeled sialic acids, comprising step (a) incubating said free sialic acids with an effective amount of DMB in an aqueous solution comprising (i) an aqueous solution of glycine and an acid, wherein the glycine is present in a molarity of 0.25M to 3M and the solution has a pH of 1.5-3.2, and (ii) a reductant selected from thioglycerol and β-mercaptoethanol ("BME"), for a time and at a temperature sufficient to allow labeling, thereby labeling the free sialic acids with DMB. In some embodiments, the solution further comprises sodium dithionite. In some embodiments, the acid is phosphoric acid. In some embodiments, the acid is hydrochloric acid. In some embodiments, the molarity of the glycine is from 0.25M to 2.5 M±0.25M. In some embodiments, the molarity of the glycine is from 0.25M to 2.0 M±0.25M. In some embodiments, the molarity of the glycine is from 0.40M to 1.75M±0.25M. In some embodiments, the molarity of the glycine is from 0.4M to 1.5 M±0.25M. In some embodiments, the molarity of the glycine is from 0.4 M to 1.25 M±0.25M. In some embodiments, the molarity of the glycine is from 0.5M to 1M±0.25M. In some embodiments, the molarity of the glycine is from 0.5M to 0.9M In some embodiments, the molarity of the glycine is from 0.6M to 0.8M±0.1M. In some embodiments, the molarity of the glycine is 0.75M±0.1M. In some embodiments, the molarity of the glycine is 0.75M±0.05M. In some embodiments, the solution has a pH of 2 to 3.2. In some embodiments, the solution has a pH of 2.5±0.1 to 3. In some embodiments, the solution has a pH of 2.7±0.25 to 2.9±0.25. In some embodiments, the solution has a pH of 2.8±0.25. In some embodiments, the acid is phosphoric acid. In some embodiments, the acid is hydrochloric acid. In some embodiments, the time sufficient to label the free sialic acids is 1-6 hours. In some embodiments, the time sufficient to label the free sialic acids is 2-5 hours. In some embodiments, the time sufficient to label the free sialic acids is 3 hours±30 minutes. In some embodiments, the time sufficient to label the free sialic acids is 2.5 hours±30 minutes. In some embodiments, the temperature sufficient to label the free sialic acids is 35-65° C. In some embodiments, the temperature sufficient to label the free sialic acids is 50° C.±5° C. In some embodiments, the method further comprises step (b), separating the free, DMB-labeled sialic acids. In some embodiments, the separating of the free, DMB-labeled sialic acids is by subjecting them to liquid chromatography. In some embodiments, the method further comprises step (c), analyzing the free, separated DMB-labeled sialic acids by subjecting them to an analytical method. In some embodiments, the analytical method is fluorescence detection. In some embodiments, the analytical method is UV detection.

In a second group of embodiments, the invention provides methods of releasing, labeling and, optionally, analyzing, sialic acids present on a glycoconjugate, comprising: (a) contacting a desired volume of the glycoconjugate with a first aqueous solution, comprising glycine adjusted with an acid to a pH of 1.5-3.2, (b) incubating the glycoconjugate with the first aqueous solution for a time and at a temperature sufficient to release the sialic acids from the glycoconjugate, thereby releasing the sialic acids from said glyconjugate, (c) cooling the released sialic acids in the first aqueous solution to a temperature of 50° C.±10°, (d) contacting the released sialic acids with a solution consisting of (i) an effective amount of 1, 2-diamino-4, 5-methylenedioxybenzene ("DMB"), (ii) a second aqueous solution comprising glycine adjusted to a pH of 1.5-3 with an acid, and (iii) an effective amount of one or more reductants, thereby forming a sample/labeling mixture, and, (e) incubating the sample/labeling mixture for a time and at a temperature sufficient to label the released sialic acids in the mixture, thereby labeling said released sialic acids with DMB. In some embodiments, the glycoconjugate is a glycoprotein. In some embodiments, the glycoconjugate is a glycolipid or oligosaccharide. In some embodiments, the first aqueous solution is from 0.25 to 2.0 M glycine and is pH adjusted with an acid to a pH of 1.5-3.2. In some embodiments, the first aqueous solution is from 0.25 to 2.0 M glycine and is pH adjusted with an acid to a pH of 2-3. In some embodiments, the first aqueous solution is from 0.25 to 2.0 M glycine and is pH adjusted with an acid to a pH of 2.5-3. In some embodiments, the first aqueous solution is from 0.25 to 2.0 M glycine and is pH adjusted with an acid to a pH of 2.8±0.1. In some embodiments, the second aqueous solution is from 0.25 to 2.0 M glycine and is pH adjusted with an acid to a pH of 1.5-3.2. In some embodiments, the second aqueous solution is from 0.25 to 2.0 M glycine and is pH adjusted with an acid to a pH of 2-3. In some embodiments, the second aqueous solution is from 0.25 to 2.0 M glycine and is pH adjusted with an acid to a pH of 2.5-3. In some embodiments, the second aqueous solution is from 0.25 to 2.0 M glycine and is pH adjusted with an acid to a pH of 2.8±0.1. In some embodiments, the acid in the first aqueous solution is phosphoric acid. In some embodiments, the acid in the second aqueous solution is phosphoric acid. In some embodiments, the acid in the first aqueous solution and in the second aqueous solution adjusting the pH of said solutions is phosphoric acid. In some embodiments, the acid in the first aqueous solution is hydrochloric acid. In some embodiments, the acid in the second aqueous solution adjusting the pH of said solution is hydrochloric acid. In some embodiments, the acid in the first aqueous solution and in the second aqueous solution is hydrochloric acid. In some embodiments, the one or more reductants comprises β-mercaptoethanol ("BME"). In some embodiments, the one or more reductants comprises thioglycerol. In some embodiments, the one or more reductants comprises BME and sodium dithionite. In some embodiments, the one or more reductants comprises thioglycerol and sodium dithionite. In some embodiments, the time to release the sialic acids in step (b) is 0.5-5 hours. In some embodiments, the time to release the sialic acids in step (b) is 1.0-4 hours. In some embodiments, the time to release the sialic acids in step (b) is 2 hours±30 minutes. In some embodiments, the temperature used to release the sialic acids in step (b) is 70-100° C. In some embodiments, the temperature used to release the sialic acids in step (b) is 70-90° C. In some embodiments, the temperature used to release the sialic acids in step (b) is 80° C.±5° C. In some embodiments, the time used to label the released sialic acids in step (e) is 1-6 hours. In some embodiments, the time sufficient to label the released sialic acids in step (e) is 2-5 hours. In some embodiments, the time sufficient to label the released sialic acids in step (e) is 3 hours±30 minutes. In some embodiments, the time sufficient to label the released sialic acids in step (e) is 2 hours±30 minutes. In some embodiments, the temperature sufficient to label the released sialic acids in step (e) is 35-65° C. In some embodiments, the temperature sufficient to label the released sialic acids in step (e) is 50° C.±5° C. In some embodiments, the methods further comprise step (f), separating the released, DMB-labeled sialic acids. In some of these embodiments, the separating of the released, DMB-labeled sialic acids is by subjecting them to liquid chromatography. In some embodiments in which the released, DMB-labeled sialic acids have been separated, the methods further comprise step (g), analyzing the released, separated DMB-labeled sialic acids by subjecting them to an analytical method. In some of these embodiments, the analytical method is by detecting fluorescence.

In yet a further group of embodiments, the invention provides kits for labeling free sialic acids with 1, 2-diamino-4, 5-methylenedioxybenzene ("DMB"). The kits comprise DMB, glycine, an acid, and a reductant. Conveniently, the DMB, glycine, an acid, and reductant may be disposed in one or more containers. In some embodiments, the acid is phosphoric acid. In some embodiments, the acid is hydrochloric acid. In some embodiments, the glycine is pre-mixed in a solution with said acid. In some embodiments, the solution comprising said glycine mixed with an acid has a pH between 2 and 3. In some embodiments, the kit further comprises sodium dithionite. In some embodiments, the reductant is β-mercaptoethanol ("BME"). In some embodiments, the reductant is thioglycerol. In some embodiments, the acid is hydrochloric acid and the reductant is thioglycerol. In some embodiments, the acid is phosphoric acid and the reductant is thioglycerol. In some embodiments, the kit further comprises one or more sialic acid standards. In some embodiments, the kits further comprise one or more sialidases. In some embodiments, the kits comprise (a) glycine in a solution adjusted with phosphoric acid to a pH of 2.8, (b) thioglycerol, (c) DMB, and (d) sodium dithionite. In some of these embodiments, the thioglycerol is provided at 0.72 molar±0.1 molar, the DMB is provided at 5 millimolar±1 millimolar, and the sodium dithionite is provided at 56 millimolar±10 millimolar.

DETAILED DESCRIPTION

Introduction

Figure 1:
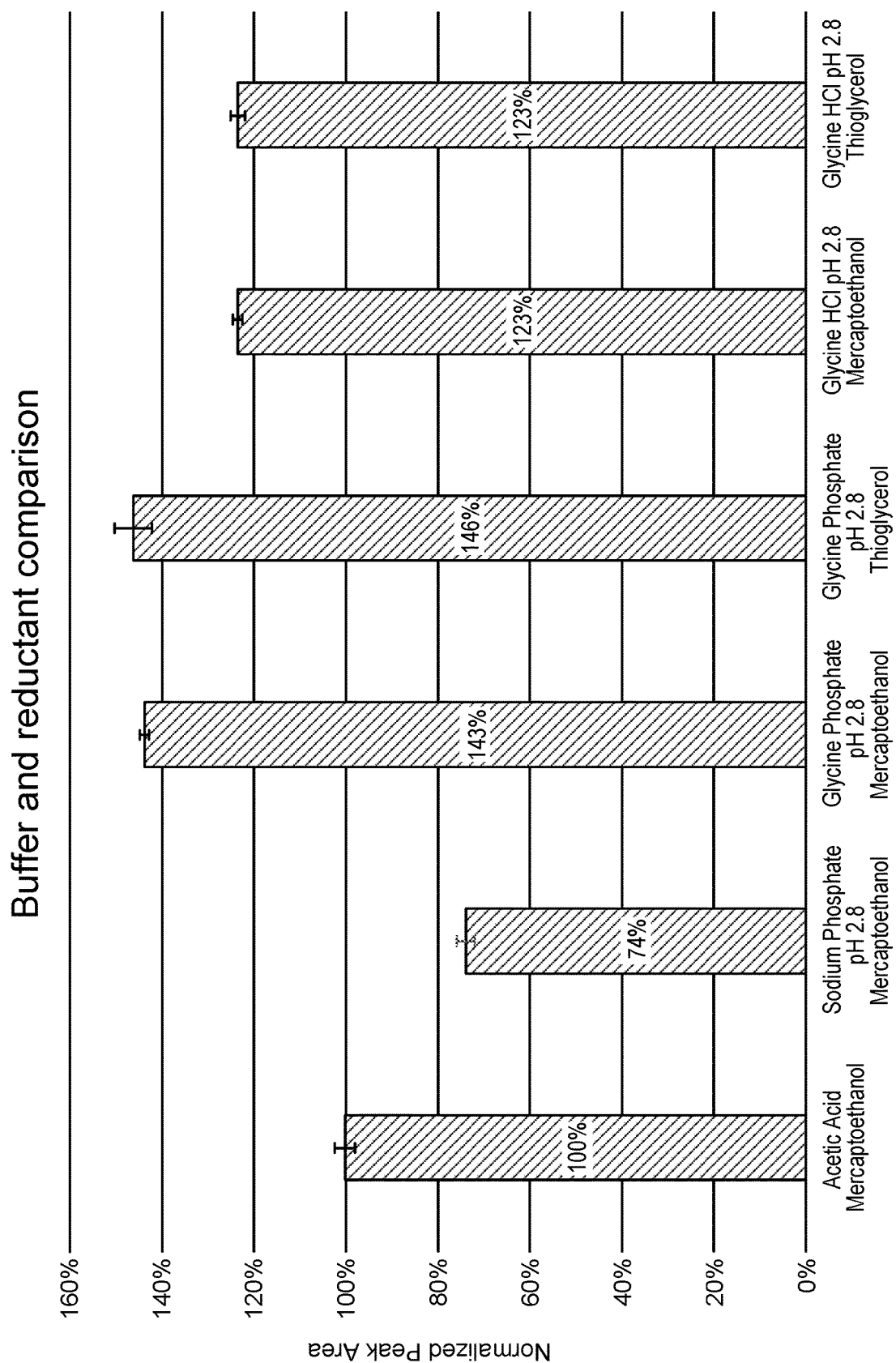
FIG. 1 is a bar graph showing the results of studies comparing the fluorescent signal detected from an exemplar sialic acid standard after equal amounts of the sialic acid were labeled with the dye 1, 2-diamino-4, 5-methylenedioxybenzene ("DMB") in a labeling solution comprising (a) an acidic buffer provided by one of: 1.5M acetic acid, 1.5M phosphoric acid titrated to a pH of 2.8 with sodium hydroxide ("Sodium Phosphate"), a 1.5M solution of glycine adjusted with phosphoric acid to a pH of 2.8 ("Glycine Phosphate"), or a 1.5M solution of glycine adjusted with hydrochloric acid to a pH of 2.8 ("Glycine HCl"), (b) a reductant chosen from β-mercaptoethanol ("Mercaptoethanol") or thioglycerol, and (c) sodium dithionite. To permit ready comparison, the signal from the sialic acid labeled in the presence of the standard reagents, acetic acid, β-mercaptoethanol and sodium dithionite, was stated to be 100%, as shown in the first bar from the left, while the signal from labeling the same sialic acid in the presence of the other reagents noted below the bars is stated as a percentage of the signal from the sialic acid labeled in the presence of the standard reagents.

As set forth in the Background, analysis of the kind and quantity of glycans attached to glycoconjugates such as glycoproteins and glycolipids is important for various regulatory and quality control purposes. In particular, analyzing the types of glycans attached to therapeutic glycoproteins such as monoclonal antibodies, and the amount of each type of glycan, has become an important quality control measurement in the production of such glycoproteins and in confirming that they will have the desired pharmacological activity.

Sialic acids are a family of N- and O-derivatives of neuraminic acid, a nine-carbon acid, which are found at the terminal end of sugar chains attached to glycoproteins and glycosides. Glycoconjugates such as glycoproteins can have different half-lives and biological activity depending on whether sialic acids are present on them and, if so, which ones are present. Accordingly, determining the amount and type of sialic acids present on a glycoconjugate of interest is important to determining the biological properties of the glycoconjugate. For glycoproteins, such as fusion proteins, that are intended for use as therapeutic agents, confirming that the sialyation of the glycoprotein has remained the same throughout production may be important both for maintaining consistency of the intended biological effect and for regulatory approval.

Sialic acids are typically released from glycoconjugates by partial acid hydrolysis or by enzymatic digestion of the glycoconjugate by any of a number of sialidases. Sialic acids that are not attached to a glycoconjugate, such as sialic acids released from a glycoconjugate from either of these methods or sialic acids provided as reference standards, are sometimes referred to herein as "free sialic acids." Free sialic acids are typically labeled with the dye 1, 2-diamino-4, 5-methylenedioxybenzene ("DMB") in an aqueous, acidic solution in the presence of one or more reductants (labeling free sialic acids with DMB will sometimes be referred to herein as the "labeling reaction.") Typical DMB-labeling protocols call for incubating the sialic acids with DMB in the aqueous, acidic solution for two to three hours at 50° C. Following the labeling reaction, the DMB-labeled sialic acids are typically separated by liquid chromatography, such as high performance liquid chromatography ("HPLC"), and then analyzed by providing the separated, DMB-labeled sialic acids to a fluorescence detector or to an ultraviolet ("UV") detector. Releasing sialic acids from glycoproteins by partial acid hydrolysis, labeling of sialic acids with DMB, and detecting the labeled sialic acids by fluorescence detection have been employed since at least the early 1990s (see, e.g., Lagana et al, Anal. Biochem, 1993, 215(2):266-272; Hayakawa et al., J Chromatography B: Biomed Sci and Applns, 1993, 620(1):25-31; Kawano et al., J Biol Chem, 1995, 270(27):16458-16463). It is assumed that the practitioner is familiar with current techniques and conditions used for releasing sialic acids from glycoconjugates, for conducting DMB labeling of free sialic acids, whether released from a glycoconjugate or a reference standard, and for the subsequent separation and detection of sialic acids that have been labeled with DMB. It is also noted that it is conventional in the art to refer to sialic acids that have been labeled with DMB as "DMB-labeled sialic acids," whether or not they are within the chemical definition of a sialic acid after having been labeled. That usage will be followed herein.

While DMB labeling has been used for decades to provide detection of sialic acids, it would be desirable to further improve the sensitivity of detection of DMB-labeled sialic acids by increasing the signal from labeled sialic acids. Further, current methods have several drawbacks. In particular, the acid typically used to maintain the acid conditions needed for the labeling reaction is acetic acid, which has a strong odor and is volatile. The volatility can cause loss of the acid, and a consequent change in molarity and reagent amount, if care is not taken to keep the container holding the acid capped before and during the labeling reaction. And, the reductant most commonly used in the labeling procedure is β-mercaptoethanol (also referred to herein as "BME"). Unfortunately, BME is not only a toxin, but also has a strong and unpleasant odor. It would be desirable to have an alternative reductant that has a less objectionable odor and potentially less toxicity.

Surprisingly, it has now been discovered that acetic acid, the acid used for decades in protocols for labeling free sialic acids with DMB can not only be replaced, but also that replacing the acetic acid with the zwitterionic amino acid glycine, adjusted with a strong acid to the desired pH, resulted in a dramatic increase in the signal from an exemplar free sialic acid labeled with DMB in the presence of the acid-buffered glycine compared to the same free sialic acid when labeled with DMB in the presence of the art-standard acetic acid. A glycine solution adjusted to a desired pH with an acid is sometimes referred to herein as "acid-buffered glycine," and the resulting solution of glycine in an acidic solution is sometimes referred to herein as a "glycine buffer" or as an "acidic glycine buffer."

This increase in signal is expected to significantly increase the sensitivity of the assay and to improve the ability to detect free sialic acids in a sample, whether the free sialic acids are reference standards, are sialic acids obtained by enzymatic release from a glycoconjugate by a sialidase, or are obtained from a glycoconjugate by partial acid hydrolysis. The increase in signal is expected to significantly improve the ability to detect sialic acids present on a glycoconjugate of interest only in small quantities and to determine the sialic acids present on a glycoconjugate of interest where the glycoconjugate is available only in small quantities. In preferred embodiments, the glycoconjugate is a glycoprotein.

Even more surprisingly, it has also been discovered that the use of acid-buffered glycine also dramatically reduces artifacts seen when free sialic acids labeled with DMB are subsequently analyzed by fluorescence detection. The reduction in artifacts makes it easier to detect the presence of sialic acids present in a sample only in small quantities. The combination of both increasing the signal strength and reducing artifacts makes the new combinations of reagents, and procedures and kits utilizing them, surprisingly more sensitive in their ability to obtain and analyze a signal from DMB-labeled sialic acids than the labeling reactions currently used in the art.

Further, it has also been discovered that BME, the reductant used for years in protocols for DMB-labeling of sialic acids, can be replaced with thioglycerol, which has a lower odor and is less toxic than BME. Studies underlying the present invention showed thioglycerol to result in DMB-labeling at least equivalent to DMB-labeling of sialic acids in the presence of BME and can even result in a stronger signal compared to labeling the same sialic acid with DMB in the presence of BME.

Using Acid-Buffered Glycine Increases the Signal from DMB Labeling of Sialic Acids In one aspect of the invention, it has been found (1) that substituting acid-buffered glycine for the acetic acid traditionally used to provide the mild acidic conditions for the DMB-labeling reaction results in surprisingly better signal from the labeled sialic acids, and (2) that the reductant traditionally used in DMB labeling can be changed to one that has a lower odor and that is less toxic, and still obtain an equivalent signal. (For clarity, it is noted that all the studies below included a second reductant, sodium dithionite, which is also known as sodium thiosulfite. Previous studies have indicated that DMB-labeling is better when both BME and sodium dithionite were used than with either one alone.)

In studies underlying the present invention, the fluorescent signal from a sample of an exemplar sialic acid, Neu5Ac, labeled by DMB in an aqueous solution in which the acidic conditions were provided by acetic acid and the reducing agent was BME was compared to the signal from the same sialic acid when labeled in an aqueous solution in which the acidic conditions were provided by phosphoric acid adjusted to a pH of 2.8 by addition of sodium hydroxide, or with glycine adjusted to a pH of 2.8 by either phosphoric acid or hydrochloric acid. After DMB-labeling, the solution was subjected to HPLC separation and then to fluorescence detection to quantitate the signal from the labeled Neu5Ac.

FIG. 1 presents the results obtained by labeling Neu5Ac using the reagents discussed above. To facilitate comparison of the results, the peak area obtained using the conventional reagents, acetic acid and BME, were normalized to 100%, with the signals for the other combinations of reagents shown as percentages to that signal. As persons of skill will recognize, the peak area is the integral of the area under the curve and is a quantitation of the signal.

Referring to FIG. 1, labeling the sialic acid in acidic conditions provided by phosphoric acid adjusted to a pH of 2.8 with sodium hydroxide (shown on the graph as "sodium phosphate"), resulted in a signal only 74% as strong as that obtained when the sialic acid was labeled in acidic conditions provided by acetic acid. However, when the sialic acid was labeled in acidic conditions provided by glycine adjusted to a pH of 2.8 with phosphoric acid ("glycine phosphate"), the signal was 143% that obtained using the standard acid, acetic acid, to provide the acidic conditions, as shown by the third bar from the left. (As discussed in the Examples, below, the solutions used in the studies shown in FIG. 1 were made by starting with a 3M aqueous solution of glycine and adjusting the pH of the solution with an acid. The same solution could, however, be made by taking the amount of the selected acid added to the glycine solution in the preceding sentence and adding to it the same amount of 3M glycine solution.) The beneficial effect of using glycine adjusted to a desired pH with acid was confirmed by performing the same assay, but a solution of 3M glycine adjusted to a pH of 2.8 with hydrochloric acid (this solution is sometimes referred to herein as "glycine hydrochloride"). As shown in FIG. 1, fifth bar from the left, DMB-labeling of the sialic acid in the presence of glycine hydrochloride and BME resulted in a signal 123% that of the same sample labeled in the presence of the standard acid, acetic acid, and the same reductant.

Further, the study tested whether thioglycerol (3-Mercaptopropane-1,2-diol, sometimes referred to herein as "TG"), a reductant that has less of a strong odor than BME and that is less toxic than BME, could replace BME as the reductant of choice to label free sialic acids with DMB. Performing DMB-labeling of the exemplar sialic acid in acidic conditions provided by glycine adjusted to a pH of 2.8 with phosphoric acid, but using thioglycerol as the reductant, increased the signal to 146% that of the same sialic acid when labeled in acidic conditions provided by acetic acid, and BME, an even better result than obtained when labeling the same sialic acid in the presence of glycine adjusted to a pH of 2.8 with phosphoric acid, and BME. Further, DMB-labeling of the exemplar free sialic acid in the presence of glycine adjusted to a pH of 2.8 with hydrochloric acid, and thioglycerol, increased the signal to 123% that of the same sialic acid when labeled in the presence of acetic acid and BME. The results show that BME can be replaced as the reductant in DMB-labeling with thioglycerol, a reductant that is a less objectionable odor than BME, and which is less toxic than BME, while still achieving equivalent, and in some cases, better, signal from the labeling.

Changing the Acid Dramatically Reduces Artifacts

Figure 2:
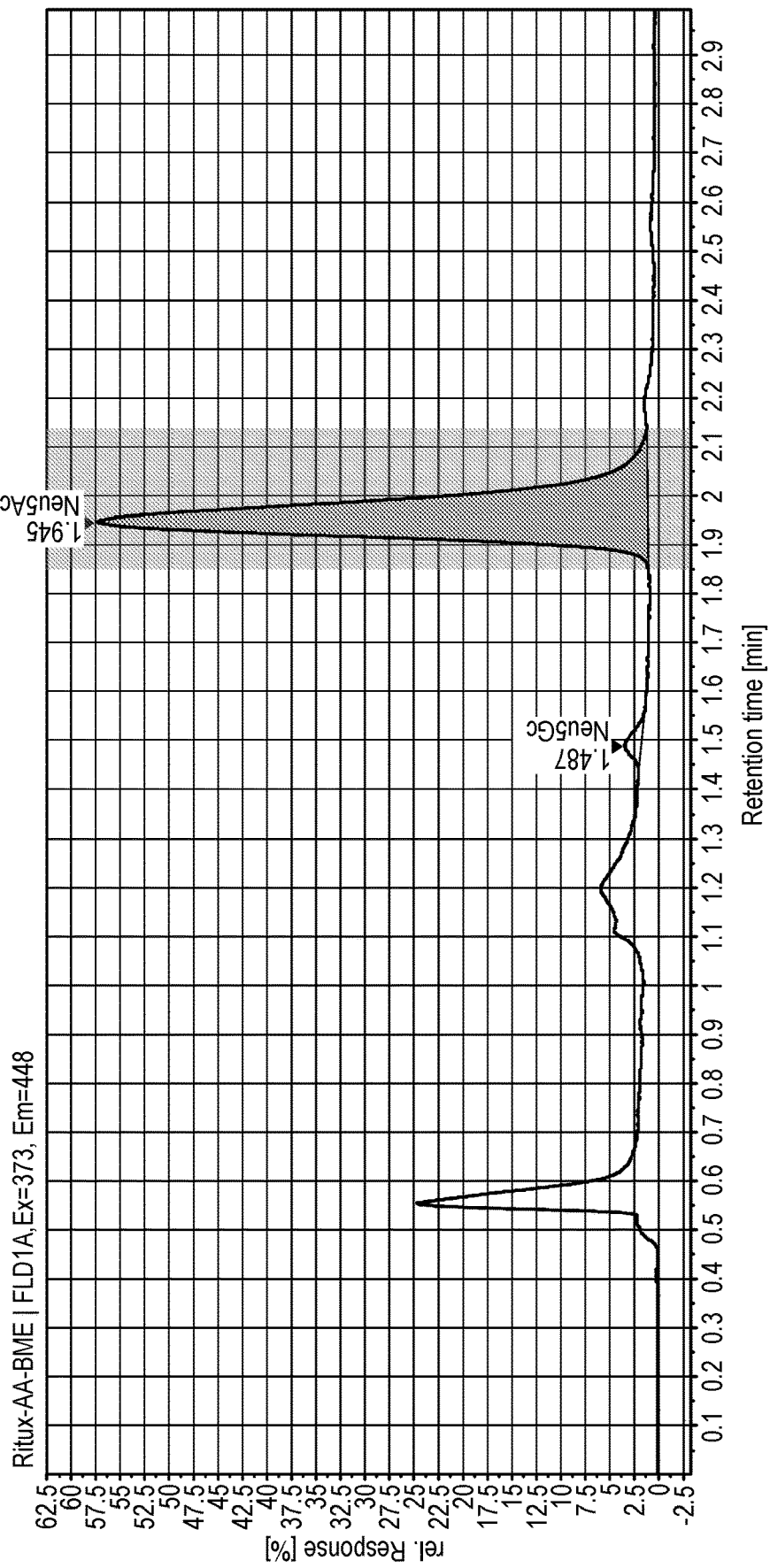
FIG. 2 is a chromatogram (a graph of the fluorescence readout from a fluxorescence detector) of sialic acids released from the chimeric monoclonal antibody rituximab and labeled with DMB in a solution comprising acetic acid, β-mercaptoethanol ("Mercaptoethanol"), and sodium dithionite. The shaded area is the peak for the sialic acid Neu5Ac. A small peak at retention time 1.5 minutes is the peak for the sialic acid Neu5Gc. The peak at retention time 0.5-0.6 minute is an artifact.

As noted above, studies underlying the present invention showed that labeling sialic acids with acid-buffered glycine and reductant sharply reduced artifacts compared to labeling sialic acids with the standard acid and reductant used in DMB-labeling, acetic acid and BME. FIG. 2 shows a chromatogram of sialic acids released from rituximab, a commercially important therapeutic chimeric monoclonal antibody used in treating leukemias and lymphomas, among other conditions. The released sialic acids were labeled in a standard buffer solution containing acetic acid and BME (as with the other labeling solutions reported herein, sodium dithionite was also present), separated on an HPLC column, and flowed through and detected by a fluorescence detector. The Y axis of the graph plots the relative response (in %), and the X axis of the graph plots the retention time in minutes as the components of the sample flow through the fluorescence detector. In this chromatogram, the highest peak shows a value of almost 57.5, reflecting the presence of the sialic acid Neu5Ac in the sample, at retention time between approximately 1.85 and 2.15 minutes. A second large peak, measuring almost 25, or approximately 43% of the peak for the sialic acid Neu5Ac, appears at the retention time from 0.5 to 0.6 minutes. This peak is, however, an artifact, as there is no sialic acid coming off the HPLC column at that time. At retention time 1.5 minutes, a smaller peak, measuring about 4, is seen. This peak represents the sialic acid Neu5Gc, and is approximately 16% of the height of the peak for the artifact.

Figure 3:
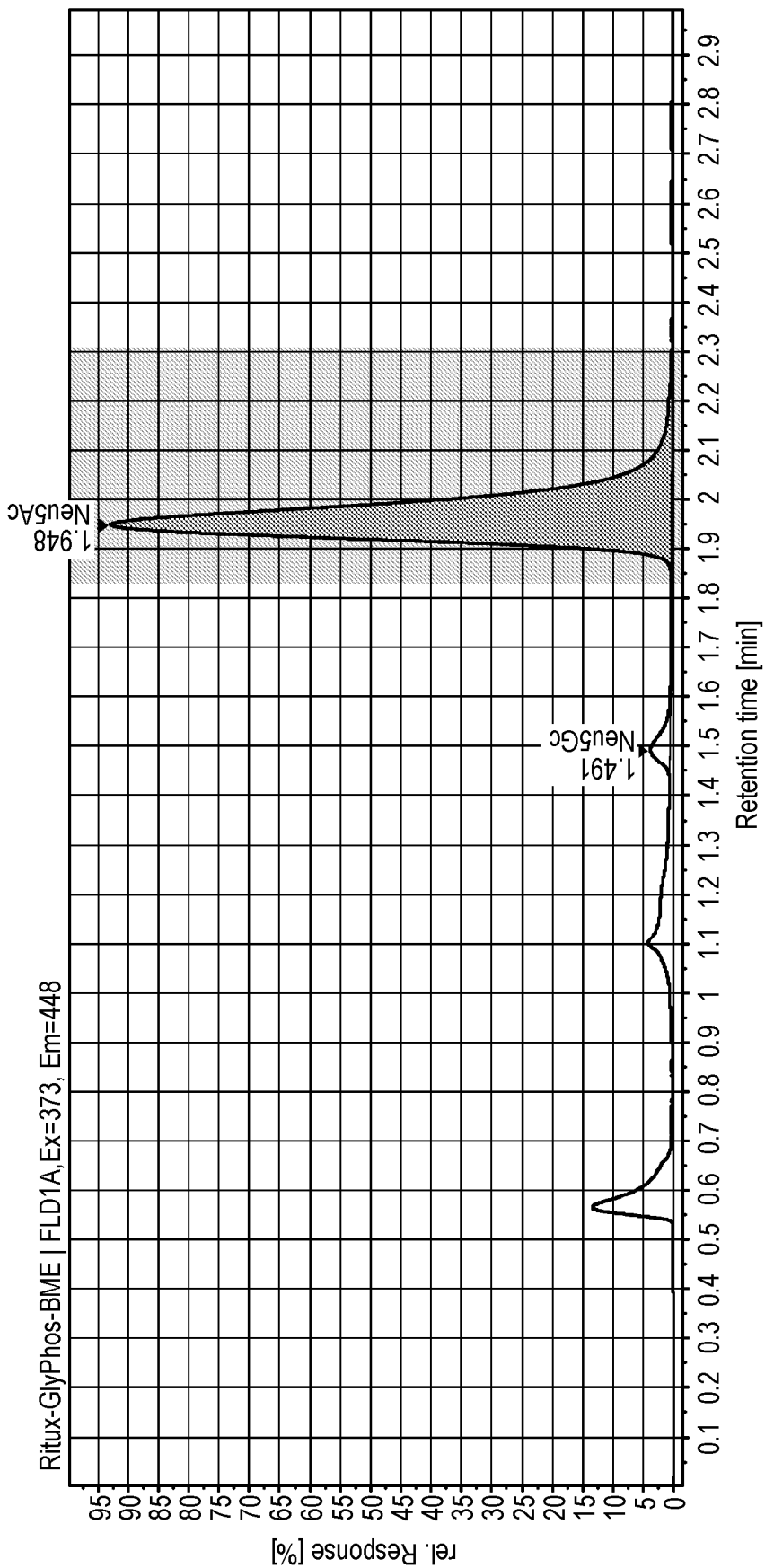
FIG. 3 is a chromatogram of sialic acids released from the chimeric monoclonal antibody rituximab and labeled with DMB in a solution comprising glycine adjusted by phosphoric acid to a pH of 2.8 ("Glycine Phosphate"), thioglycerol, and sodium dithionite. The shaded area is the peak for the sialic acid Neu5Ac. The small peak at retention time 1.5 minutes is the peak for the sialic acid Neu5Gc. The peak at retention time 0.5-0.6 minute is an artifact.

FIG. 3 shows the chromatogram of the same sample containing sialic acids, but in which the sialic acids were labeled in a solution in which glycine phosphate provided the acidic conditions. BME was again used as the reductant (as in the other studies reported herein, sodium dithionite was also present in the solution). The axes are as described for FIG. 2. In this chromatogram, the peak for the sialic acid Neu5Ac shows a value of almost 95. The peak at the retention time from 0.5 to 0.6, reflecting the artifact, has a height of approximately 13, or approximately 14% of the height of the peak for Neu5Ac, whereas in FIG. 2, the peak for the artifact was 43% that of the peak for Neu5Ac. The smaller peak seen at retention time 1.5 minutes, which represents the peak for the sialic acid Neu5Gc, is again about 4, but is now approximately 31% of the height of the peak for the artifact, while in FIG. 2, the peak for this sialic acid was only 16% of the height that of the artifact. Thus, the change from acetic acid to a glycine solution with a pH adjusted by addition of a strong acid surprisingly reduces artifacts seen in fluorescent detection of DMB-labeled sialic acids and makes it much easier to discern the presence of the sialic acids compared to the artifacts.

Acids that can be Used for Partial Acid Hydrolysis, that can be Used with Glycine for DMB-Labeling Sialic Acids, or for Both Some sialic acids, such the abundant sialic acid N-acetylneuraminic acid (Neu5Ac or NANA), are acetylated. Strong acids have often been avoided in the past for use with analyzing sialic acids because the strong acids can deacetylate acetylated sialic acids, "collapsing" the sialic acid and causing a loss of information about the sialic acids present on the starting glyconjugate. Perhaps partly for this reason, protocols for partial acid hydrolysis of sialic acids have often used acetic acid, which is considered to be a weak acid, in DMB-labeling reactions.

As shown in FIG. 1, studies underlying the present specification using the zwitterionic amino acid glycine, brought by addition of an acid to a chosen pH suitable to performing DMB-labeling, resulted in a significantly higher signal from labeling of an exemplar acetylated sialic acid (Neu5Ac) than did labeling in acidic conditions provided by either the standard reagent, acetic acid, or by phosphoric acid adjusted to the same chosen pH with sodium hydroxide.

Referring to FIG. 1, the first bar from the left shows the signal from a sample of Neu5Ac DMB-labeled in acidic conditions provided by acetic acid, with BME as the reductant, with the signal set as 100% to provide ready comparison to the signal from the same amount of the same sialic acid labeled using the other reagents shown under the bars. As shown in the second bar from the left, sialic acids labeled in the presence of phosphoric acid adjusted to a pH of 2.8 with sodium hydroxide, with BME as the reductant, resulted in a signal only 74% that of labeling in the presence of acetic acid and the same reductant (first bar). The third bar from the left, however, shows that the signal from the same amount of the same sialic acid labeled with DMB in the presence of glycine adjusted by addition of phosphoric acid to a pH of 2.8 gave a signal 43% higher than labeling that sialic acid in the presence of acetic acid and almost double the signal of the same acid adjusted to the same pH but by addition of a strong base. Similarly, DMB-labeling the same sialic acid in the presence of glycine adjusted by addition of hydrochloric acid to a pH of 2.8 resulted in a signal 123% that of an identical sialic acid sample labeled in the presence of acetic acid, showing that glycine adjusted to an appropriate pH with a strong acid can be used in the inventive methods and kits.

Based on these results, it is expected that glycine adjusted to a pH of 1.5-3.2 with other strong acids, such nitric acid, sulfuric acid, trifluoroacetic acid ("TFA"), hydrobromic acid, hydroiodic acid, perchloric acid, and chloric acid, will provide similar improvement in signal strength in DMB-labeling of free sialic acids compared to DMB-labeling of free sialic acids using the art-standard acetic acid and will be useful in the inventive methods and kits. In some embodiments, the pH of the glycine solution is adjusted to a pH preferably adjusted to a pH of about 2 to 3.2 (where "about" means±0.25), in some, it is adjusted to a pH preferably about 2.5 to 3 (where "about" means±0.25), in some, more preferably it is adjusted to a pH about 2.7 to 3.2 (where "about" means±0.2), b in some, more preferably it is adjusted to a pH of 2.7-2.9, still more preferably it is adjusted to a pH of 2.8±0.5, in some, even more preferably it is adjusted to a pH of 2.8±0.2, and, most preferably it is adjusted to a pH of pH 2.8.

Corrosive acids (including hydrochloric acid) can be used in the inventive methods and kits, but require care in their use to prevent accidental or incidental contact with the acid by personnel conducting the labeling.

Concentrations of the acid are preferably 0.25M to about 2M, with "about" with respect to acid concentration meaning±0.25M.

As persons of skill are aware, the pH of the labeling reaction affects how long it takes for the labeling reaction to proceed. At a pH above 3.2, the labeling reaction proceeds more slowly, and will therefore take longer. As receiving results more quickly is usually preferable to receiving them after a longer period, it is preferred that the pH of the labeling reagent is 3.2 or under. Suitable pH ranges are set forth above. In studies reported in the Examples, the solutions tested were created by mixing enough glycine into water to form a 3M solution and then adjusting the pH of the glycine solution by addition of amounts of the acids mentioned in the Examples until the desired pH was reached.

Glycine is amphoteric; in water, glycine has a pH of approximately 7. The practitioner does not need to start with a 3M solution; 3M solutions were used in some of the studies conducted in the course of the work discussed herein so that, when other reagents were added, the resulting mixture would be at a preselected concentration of glycine in acidic solution to allow DMB-labeling to proceed efficiently. Practitioners can readily select other starting concentrations of glycine to be mixed with acid to obtain a solution with the desired pH and concentration for use in the inventive methods and kits.

Any particular acid, and any particular concentration of an acid of interest (which may for convenience be referred to as the "test acid" or the "test concentration," respectively) can be readily tested for its suitability for use in DMB-labeling of sialic acids by two tests. First, the test acid or test concentration can be added to a 3M aqueous solution of glycine to determine if the test acid or test concentration can lower the pH of the glycine to 1.5-3.2. If it cannot, the test acid or test concentration is not suitable for use in the inventive methods and kits. Second, the test acid or test concentration and 1.5M acetic acid can be run in parallel assays with BME to DMB-label identical quantities of known sialic acids, and comparing the fluorescence signals from the sialic acids labeled in the presence of the acetic acid and those labeled in the presence of the test acid or test concentration. If the sialic acids labeled in the presence of test acid or test concentration, or both, results in a signal at least 10% higher than the signal from sialic acids labeled in the presence of the 1.5M acetic acid, preferably 20% higher, the test acid or test concentration, or both, is suitable for use in the inventive methods and kits.

Glycine adjusted to a pH between 1.5-3.2 with a first acid can be used in the partial acid hydrolysis release step. The same combination of glycine and first acid can also be used in the DMB-labeling step, or the DMB-labeling step can use glycine adjusted to the desired pH with a second acid. For example, the partial acid hydrolysis step could be conducted with glycine adjusted to a desired pH with phosphoric acid (first acid), while glycine adjusted to a desired pH with hydrochloric acid (second acid) could be used to perform the DMB-labeling step. It is expected, however, that for convenience, practitioners will usually avoid making up two different acid solutions and will instead choose an acid to use in adjusting the pH of the glycine solution, make up a glycine solution/acid mixture of the desired pH, and use aliquots of that mixture in both steps. As reported in the Examples, a glycine solution adjusted with an acid to a pH of 2.8 was used to perform the acid hydrolysis, and then mixed with a labeling solution containing glycine buffered with the same acid to the same pH to perform the labeling step.

In some embodiments, one acid can be used for the acid hydrolysis step, and another acid can be used to adjust the pH of the glycine solution to the desired pH. For example, (a) acetic acid could be used to release sialic acids by acid hydrolysis, and a glycine phosphate solution used in the step to label the sialic acids released by the acid hydrolysis with DMB, (b) hydrochloric acid could be used to release sialic acids by acid hydrolysis, while a glycine phosphate solution is used to provide the acidic conditions needed to label the released sialic acids with DMB, or (c) phosphoric acid could be used to release sialic acids by acid hydrolysis, while a glycine hydrochloride solution is used to provide the acidic conditions needed to label the released sialic acids with DMB.

Releasing Sialic Acids from Glycoconjugates with Sialidases

As an alternative to releasing sialic acids from a glycoconjugate of interest, the sialic acids may be released by enzymatic digestion. As stated by Juge et al., Biochem Soc Trans., 2016, 44(1):166-175: "Sialidases (also commonly referred to as neuraminidases) are a large group of enzymes, the majority of which are exo-sialidases catalysing the cleavage of terminal sialic acids from complex carbohydrates on glycoproteins or glycolipids." A number of sialidases are known, and many are commercially available. For example, MilliporeSigma (St. Louis, MO) sells a variety of sialidases with different specificities, which were originally isolated from a number of microorganisms, including *Clostridium perfringens, Vibrio cholera, Arthrobacter ureafaciens*, and *Streptococcus pneumonia.*

Once the practitioner has chosen sialidases that will release sialic acids of interest and has conducted desialyation of the glycoconjugate, the sialic acids released from the glycoconjugate can be labeled by aliquoting a sample into a container, adding to them DMB, buffer or acid, and reductant, and labeling them as described elsewhere in this disclosure.

Separating and Analyzing DMB-Labeled Sialic Acids

Following incubation with the DMB and the labeling reagent, the labeling reaction is typically terminated by diluting the dye with an excess of water. Sialic acids labeled with DMB are then typically separated by liquid chromatography, such as high-performance liquid chromatography ("HPLC") or "ultra high-performance liquid chromatography". The separated, DMB-labeled sialic acids are then generally detected by a fluorescence detector. In some embodiments, the labeled sialic acids can be separated and then analyzed by detecting the presence of the DMB label. In some embodiments, the detection is by use of a fluorescence detector, such as an Agilent 1260 Infinity II Fluorescence Detector (Agilent Technologies, Santa Clara, CA). DMB can be detected using an excitation frequency of 373 nm and an emission frequency of 448 nm. In some embodiments, the detection is by use of a ultraviolet ("UV") detector.

Kits

In some embodiments, the invention further provides kits for releasing sialic acids from glycoconjugates, and for DMB-labeling of sialic acids, whether the sialic acids are released from glycoconjugates, or are free sialic acids, such separately provided known sialic acids that can serve as analytic and quantitative standards in assays.

The kits preferably contain an acid of choice, glycine, an acid to adjust the pH of the glycine when in solution, DMB, and one or more reductants of choice. In some embodiments, the glycine and the acid may be provided in a solution premixed to provide the glycine at the desired pH and concentration. In some embodiments, the acid is phosphoric acid. In some embodiments, the acid is hydrochloric acid. The reagents in the kits are typically provided in one or more containers.

In some embodiments, the kit contains glycine phosphate at a pH between 1.5-3.2 or of glycine hydrochloride at a pH between 1.5-3.2, more preferably 2-3, still more preferably 2.8±0.1, for use in partial acid hydrolysis of a glycoconjugate. In some embodiments, the glycine phosphate or glycine hydrochloride is provided at 3M in aliquoted amounts of 10 μl. In some embodiments, the kit contains one or more sialidases for releasing sialic acids from a glycoconjugate by enzymatic digestion.

In some embodiments, the kit further comprises DMB labeling mix for labeling free sialic acids. The DMB labeling mix preferably comprises DMB, glycine adjusted by an acid to a pH between 1-3.2, more preferably 2-3, still more preferably 2.8±0.1, and one or more reductants. In some embodiments, the reductant is BME. In some embodiments, the reductant is thioglycerol. In some embodiments, the kit further comprises sodium dithionite.

In some embodiments, the DMB labeling mix comprises 0.3M glycine phosphate pH 2.8, 0.72 molar thioglycerol, 20 millimolar DMB, and 225 millimolar sodium dithionite.

In some embodiments, the kit may contain 10 μl aliquots of a DMB labeling mixture containing 0.3M glycine phosphate pH 2.8, 0.72 molar thioglycerol, 20 millimolar DMB, and 225 millimolar sodium dithionite.

EXAMPLES

Example 1

This Example sets forth the protocol by which different acid and reductant formulations were tested with regard to their effect on the signal from sialic acids labeled with DMB in their presence.

One thousand picomoles of Neu5Ac (USP) was analyzed in each labeling test. Four replicates were analyzed for each set of labeling conditions. Each reaction (40 microliters per reaction) was incubated for 3 hours at 50° C. in a sealed container and then diluted to 200 microliters with deionized water. Five microliters of each diluted sample was analyzed by HPLC using an Agilent Poroshell 120 EC-C18 column, 2.1 millimeter diameter×75 millimeter length with 2.7 micrometer particle size. Mobile phase for the HPLC was 4% methanol and 8% acetonitrile in water with a flow rate of 0.4 milliliters per minute Example 2

This Example sets forth some of the different acid and reductant combinations in which sialic acids were labeled with DMB in the course of the work embodied in this specification.

"Acetic Acid Mercaptoethanol": 1.5 molar acetic acid (CAS 64-19-7), 0.75 molar β-mercaptoethanol ("BME," CAS 60-24-2), 14 millimolar sodium dithionite (CAS7575-14-6), 7 millimolar DMB (CAS 81864-15-5).

"Sodium Phosphate pH 2.8 Mercaptoethanol": 1.5 molar Sodium Phosphate pH 2.8, 0.75 molar β-mercaptoethanol, 14 millimolar sodium dithionite, 7 millimolar DMB. Sodium Phosphate was prepared at 3 molar (2× strength) by adjusting phosphoric acid to a pH of 2.8 with sodium hydroxide.

"Glycine phosphate pH 2.8 Mercaptoethanol": 1.5 molar Glycine phosphate pH 2.8, 0.75 molar β-mercaptoethanol, 14 millimolar sodium dithionite, 7 millimolar DMB. Glycine phosphate was prepared at 3 molar (2× strength) by adjusting glycine to a pH of 2.8 with phosphoric acid.

"Glycine phosphate pH 2.8 Thioglycerol": 1.5 molar Glycine phosphate pH 2.8, 0.75 molar thioglycerol (CAS 96-27-5), 14 millimolar sodium dithionite, 7 millimolar DMB. Glycine phosphate was prepared at 3 molar (2× strength) by adjusting glycine to a pH of 2.8 with phosphoric acid.

"Glycine HCl pH 2.8 Mercaptoethanol": 1.5 molar Glycine hydrochloride pH 2.8, 0.75 molar β-mercaptoethanol, 14 millimolar sodium dithionite, 7 millimolar DMB. Glycine hydrochloride was prepared at 3 molar (2× strength) by adjusting glycine to a pH of 2.8 with hydrochloric acid.

"Glycine HCl pH 2.8 Thioglycerol": 1.5 molar Glycine HCl pH 2.8, 0.75 molar thioglycerol (CAS 96-27-5), 14 millimolar sodium dithionite, 7 millimolar DMB. Glycine hydrochloride was prepared at 3 molar (2× strength) by adjusting glycine to pH 2.8 with hydrochloric acid.

Example 3

This Example reports the results of studies following the protocol described in Example 1 to test the reagent combinations described in Example 2. The results of the studies are shown graphically in FIG. 1. The terms in quotation marks in Example 2 correspond to how the different formulations are denoted in the legends of the bars in FIG. 1.

The signal from the sample of Neu5Ac labeled with DMB in the presence of acetic acid, BME, and sodium dithionite is shown in the first bar on the left side (the "acetic acid/BME signal"). As standard labeling protocols use acetic acid to provide the acidic conditions for the labeling and BME as the reductant, the signal provided by this formulation was used as the basis for comparison. For ease of comparison, the signal from this labeled sample was set at 100%, with the signal from the samples labeled under the other conditions tested stated as a percentage of the signal from that shown in the first bar.

As shown by the second bar from the left, a like sample of Neu5Ac labeled in the presence of the Sodium Phosphate pH 2.8 Mercaptoethanol formulation resulted in a signal only 74% that of the acetic acid/BME signal. By contrast, as shown by the third bar from the left, a like sample of Neu5Ac labeled in the presence of the Glycine Phosphate pH 2.8 Mercaptoethanol formulation resulted in a signal 143% of the signal from the standard acetic acid/BME formulation. An even better signal was seen from the sample labeled in the presence of the Glycine Phosphate pH 2.8 Thioglycerol formulation. Switching the acid to hydrochloric acid in the Glycine Phosphate pH 2.8 Mercaptoethanol formulation resulted in a signal 123% that of the acetic acid/BME signal, as shown by the fifth bar from the left. And, as shown in the last bar from the left, switching the reductant in this formulation to thioglycerol, in the Glycine Phosphate pH 2.8 Thioglycerol formulation, again resulted in a signal 123% that of the acetic acid/BME signal.

Example 4

This Example describes the protocol by which sialic acids were released from an exemplar glycoprotein of interest, labeled with DMB using two different acids, and then analyzed to see the effect on the fluorescent signal of the DMB-labeled sialic acids from altering the acid.

The therapeutically important chimeric anti-CD20 monoclonal antibody rituximab was used as the glycoconjugate of interest from which to obtain sialic acids for analysis. Two hundred micrograms of rituximab were analyzed per reaction. In the "Acid Release" step, the rituximab was incubated for 2 hours at 80° degrees Celsius in one of the acid conditions described below. This step was then followed by the "DMB Labeling" step in which sialic acids released from rituximab in the Acid Release step to which the sample had been subjected was incubated for 3 hours at 50° Celsius in a sealed container with the respective DMB Labeling mix used. The DMB Labeling step was followed by an "Analysis" step, in which each sample was diluted to 200 microliters with deionized water. Five microliters of each diluted sample was analyzed by HPLC using an Agilent Poroshell 120 EC-C18 column, 2.1 millimeter diameter×75 millimeter length with 2.7 micrometer particle size. Mobile phase for the HPLC was 4% methanol and 8% acetonitrile in water with a flow rate of 0.4 milliliters per minute.

"Acetic Acid Mercaptoethanol":

Acid Release step: Each rituximab sample was incubated with 2 molar acetic acid for 2 hours at 80° Celsius.

DMB Labeling step: To each sample was added 1.5 molar acetic acid, 0.75 molar β-mercaptoethanol, 14 millimolar sodium dithionite, and 7 millimolar DMB.

"Glycine Phosphate pH 2.8 Mercaptoethanol":

Acid Release: Each sample was incubated with 1 molar Glycine Phosphate pH 2.8 for 2 hours at 80° degrees Celsius DMB Labeling: 0.75 molar Glycine Phosphate pH 2.8, 0.75 molar β-mercaptoethanol, 14 millimolar sodium dithionite, 7 millimolar DMB. Glycine phosphate was prepared at 3 molar (2× strength) by adjusting glycine to pH of 2.8 with phosphoric acid.

Example 5

This Example sets forth the results of the studies described in Example 4.

FIG. 2 is a chromatogram graphically showing the trace of the signal coming from the fluorescence detector from sialic acids released and labeled in a buffer solution containing acetic acid and BME (as with the other labeling solutions reported herein, sodium dithionite was also present), separated on an HPLC column, and flowed through and detected by a fluorescence detector. The Y axis of the graph plots the relative response (in %), and the X axis of the graph plots the retention time in minutes as the components of the sample flow through the fluorescence detector. In this chromatogram, the highest peak shows a value of almost 57.5, reflecting the presence of the sialic acid Neu5Ac in the sample, at retention time between approximately 1.85 and 2.15 minutes. A second large peak, measuring almost 25, or approximately 43% of the peak for the sialic acid Neu5Ac, appears at the retention time from 0.5 to 0.6 minutes. This peak is, however, an artifact, as there is no sialic acid coming off the HPLC column at that time. At retention time 1.5 minutes, a smaller peak, measuring about 4, is seen. This peak represents the sialic acid Neu5Gc, and is approximately 16% of the height of the peak for the artifact.

FIG. 3 shows the chromatogram of the same sample containing sialic acids, but labeled in a labeling solution in which glycine phosphate provided the acidic conditions. BME was again used as the reductant (as in the other studies reported herein, sodium dithionite was also present in the labeling solution). The axes are as described for FIG. 2. In this chromatogram, the peak for the sialic acid Neu5Ac shows a value of almost 95. The peak at the retention time from 0.5 to 0.6, reflecting the artifact, has a height of approximately 13, or approximately 14% of the height of the peak for Neu5Ac, whereas in FIG. 2, the peak for the artifact was 43% that of the peak for Neu5Ac. The smaller peak seen at retention time 1.5 minutes, which represents the peak for the sialic acid Neu5Gc, is again about 4, but is now approximately 31% of the height of the peak for the artifact, while in FIG. 2, the peak for this sialic acid was only 16% of the height that of the artifact. Thus, the change in the acid surprisingly reduced artifacts seen in fluorescent detection of DMB-labeled sialic acids and made it much easier to discern the presence of the sialic acids compared to the artifacts.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

The invention claimed is:

1. An in vitro method for labeling free sialic acids with 1, 2-diamino-4, 5-methylenedioxybenzene ("DMB") and, optionally, for analyzing said DMB-labeled sialic acids, said method comprising step (a) incubating said free sialic acids with an effective amount of DMB in an aqueous solution comprising (i) an aqueous solution of glycine and an acid, wherein said glycine is present in a molarity of 0.25M to 3M and said solution has a pH of 1.5-3.2, and (ii) a reductant selected from thioglycerol and β-mercaptoethanol ("BME"), for a time and at a temperature sufficient to allow said labeling, thereby labeling said free sialic acids with DMB.

2. The method of claim 1, wherein said acid is phosphoric acid.

3. The method of claim 1, wherein said acid is hydrochloric acid.

4. The method of claim 1, further comprising step (b), separating said free, DMB-labeled sialic acids.

5. The method of claim 4, further comprising step (c), analyzing said free, separated DMB-labeled sialic acids by providing them to an analytical means.

6. A method of releasing, labeling and, optionally, analyzing, sialic acids present on a glycoconjugate, said method comprising (a) contacting a desired volume of said glycoconjugate with a first aqueous solution, comprising glycine adjusted with an acid to a pH of 1.5-3.2, (b) incubating said glycoconjugate with said first aqueous solution for a time and at a temperature sufficient to release said sialic acids from said glycoconjugate, thereby releasing said sialic acids from said glycoconjugate, (c) cooling said released sialic acids in said first aqueous solution to a temperature of 50° C.±10°, (d) contacting said released sialic acids with a solution consisting of (i) an effective amount of 1, 2-diamino-4, 5-methylenedioxybenzene ("DMB"), (ii) a second aqueous solution comprising glycine wherein said solution is pH adjusted to a pH of 1.5-3 with an acid, and (iii) an effective amount of one or more reductants, thereby forming a sample/labeling mixture, and (e) incubating said sample/labeling mixture for a time and at a temperature sufficient to label said released sialic acids in said mixture, thereby labeling said released sialic acids with DMB.

7. The method of claim 6, wherein said glycoconjugate is a glycoprotein.

8. The method of claim 6, in which said first aqueous solution is from 0.25 to 2.0 M glycine and is adjusted with an acid to a pH of 1.5-3.2.

9. The method of claim 6, in which said second aqueous solution is from 0.25 to 2.0 M glycine and is adjusted with an acid to a pH of 1.5-3.2.

10. The method of claim 6, wherein said acid in said second aqueous solution is phosphoric acid.

11. The method of claim 6, wherein said acid in said second aqueous solution adjusting the pH of said solution is hydrochloric acid.

12. The method of claim 6, wherein said one or more reductants comprises thioglycerol.

13. The method of claim 1, wherein said acid is phosphoric acid and said reductant is thioglycerol.

\* \* \* \* \*